Jan. 26, 1937.　　　W. H. REICHARD　　　2,068,766
TRAIN CONTROL SYSTEM FOR RAILROADS
Filed Nov. 30, 1932　　　2 Sheets—Sheet 1

Fig. 2.A.

INVENTOR
W. H. Reichard,
BY Neil W. Preston,
ATTORNEY

Jan. 26, 1937.　　W. H. REICHARD　　2,068,766
TRAIN CONTROL SYSTEM FOR RAILROADS
Filed Nov. 30, 1932　　2 Sheets-Sheet 2

INVENTOR
W. H. Reichard,
BY Neil H. Preston,
his ATTORNEY

Patented Jan. 26, 1937

2,068,766

UNITED STATES PATENT OFFICE 2,068,766

TRAIN CONTROL SYSTEM FOR RAILROADS

Wade H. Reichard, Rochester, N. Y., assignor to General Railway Signal Company, Rochester, N. Y.

Application November 30, 1932, Serial No. 645,012

20 Claims. (Cl. 246—34)

This invention relates in general to train control systems for railroads, and has more particular reference to cases where cars do not operate in electrical conducting manner with the running rails or treads supporting the car wheels.

In the usual steam railway operation the car wheels are conducting and run on conducting rails, whereby the presence of a car in a usual track block can readily manifest itself due, for example, to the usual wheel and axle shunt causing operation of a track relay in a usual track circuit, as is well understood in this art.

In cases, however, where there is no such electrical contact connection between the car and the running rails, it is most desirable to provide safe and dependable means for manifesting the presence of a car in a track section.

The conditions referred to above may arise in various circumstances, as, for example, where a vehicle is rubber tired and operates either on conducting or non-conducting rails, the vehicle being propelled in any desired manner, as by steam, or gas, or gas and electricity or the like. The problem also exists in connection with cars having either conducting or non-conducting wheels, and running on non-conducting rails or treads constructed for example of concrete, rubber or the like.

In short, in all cases where the usual metallic or electrical connection between the running rails or tread and a vehicle therein, is not present, this problem arises.

It is proposed, in accordance with the present invention, and in connection with cases where a vehicle is not in metallic or electrical connection with its running rails, to provide contact shoes for contacting with conducting rails or wires constituting part of a track circuit, to thereby manifest occupancy.

It is further proposed, in accordance with this invention, to provide a shunting means of the inductive character rather than of the conductive character, and to check the operation of the inductive shunt by means of an automatically applied conducting shunt, in the event of failure of the induction effect.

Further objects, purposes and characteristic features of the present invention will appear as the description progresses, reference being made to the accompanying drawings, showing, solely by way of example, in a wholly diagrammatic manner, and in no manner in a limiting sense, several forms which the invention can assume. In the drawings:—

Fig. 2A is a fragmentary view of a modification of part of Fig. 2.

Fig. 2B is a view of a modified form of the invention.

Figure 1:
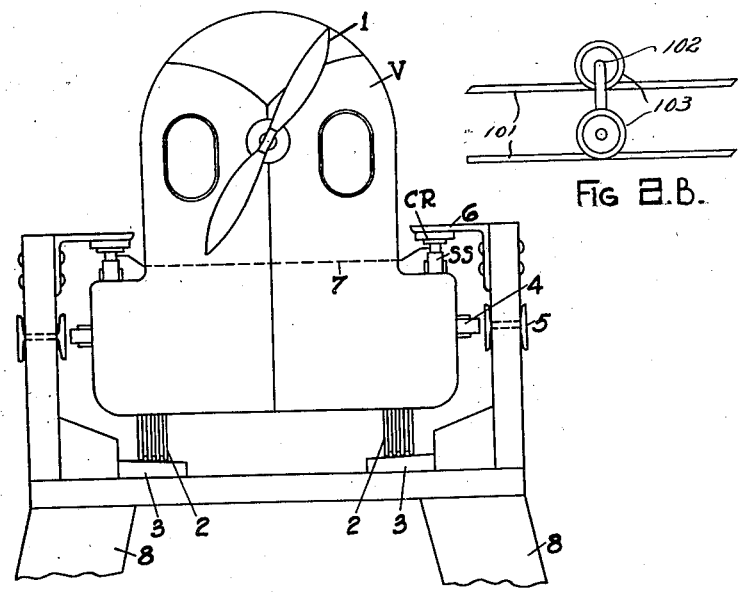
Fig. 1 is a diagrammatic, fragmentary representation of one case in which this invention can be utilized to advantage.

Referring now to the drawings, and first to Fig. 1, there is here shown one situation in which this invention can be applied to advantage. A vehicle V is shown, having a propeller 1 for driving the vehicle by turning in the air. The vehicle is shown as having rubber tired wheels 2, running on treads 3 which can be formed of either conducting or non-conducting material such as steel, concrete, rubber or the like. The vehicle has rollers 4 for at times bearing against fixed stops, or the like, 5, to limit vehicle side-sway. Shown as carried by angle irons 6, are contact rails CR, formed of electrically conducting material, such as copper or steel or the like, and in sliding contact with rails CR are shunt shoes SS, interconnected by a very low resistance and low reactance conductor 7, whereby to furnish a shunting means connected between the two contact rails CR.

The structure shown in Fig. 1 can be supported on legs 8, for example, to furnish an elevated structure, if desired, whereby to avoid grade crossings and permit of a practically gradeless trackway for the vehicle.

The particular form of vehicle and trackway just described, has been given as merely one example of a situation where this invention can be used to advantage. It is contemplated that many other situations will present themselves, such for example, as steam, or gasoline, or gasoline and electrically driven cars, with rubber, or other electrically non-conducting tires, running on usual steel rails as employed in steam railway operation.

Figure 2:
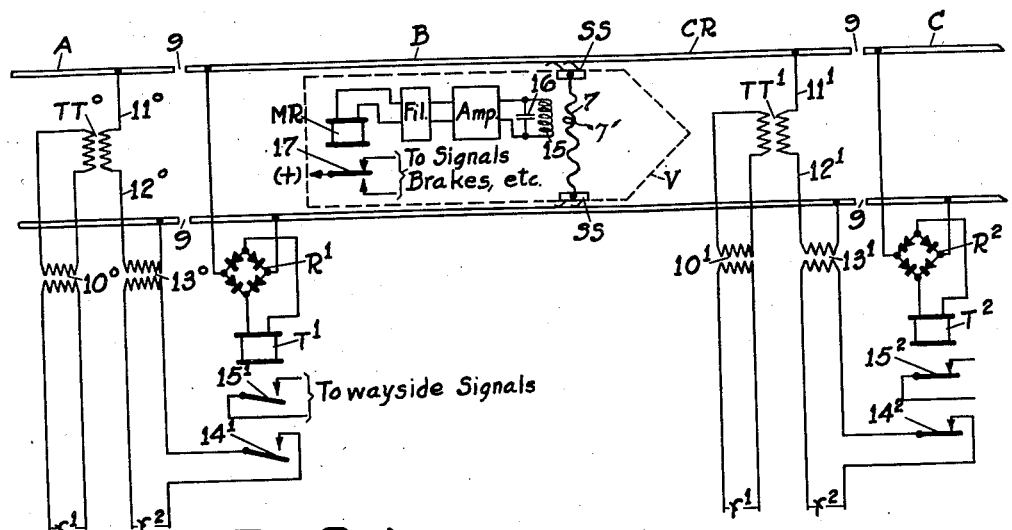
Fig. 2 is a diagrammatic view of one form of the invention.
Figure 2:
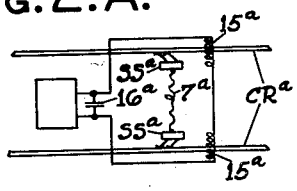

In Fig. 2 is a diagrammatic representation of trackway and car-carried apparatus in accordance with one form of the present invention.

In this form of invention the contact rails CR are separated into track blocks A, B and C, by insulating joints which in the present case are represented by gaps 9.

While the energy employed on the trackway can be either direct or alternating current, in the present case, by way of example, alternating current energy is shown as being employed. This energy includes a source $f^1$ of alternating current energy of one frequency, and a second source $f^2$, of any suitable character, of alternating current energy of a different frequency. This alternating current energy is applied across the contact rails at the exit end of each block, the energy $f^1$ being applied to the primary of a transformer 10, the secondary of which is connected to the primary of a track transformer TT, the secondary of which is connected across the contact rails by wires 11 and 12. This energy $f^1$ is track circuit energy and is always connected across the contact rails. The energy $f^2$ is connected across the rails through wires 11 and 12 and the secondary of a transformer 13, the primary of which is connected to the source of energy $f^2$, through a contact finger 14 and front point of a track relay T of the block next in advance. Thus the energy $f^2$ is connected across the rails of a block only when the track relay of the block next in advance is energized.

Connected across the entrance end of each block, as for example block B, is a track relay $T^1$, which receives its energy from the contact rails CR through a double wave rectifier $R^1$ which can be of any usual or desired type, as for example, a copper oxide rectifier. The track relays, as $T^1$, control wayside signals of any desired type, if such be employed, by means of a contact finger $15^1$, for example, whereby to control wayside signals in accordance with traffic conditions in any usual manner, as for example in Patent No. 1,614,403, granted January 11, 1927.

Represented diagrammatically by dotted lines, is a vehicle V, occupying block B. This vehicle carries apparatus as shown in Fig. 2 in a diagrammatic manner. This apparatus includes shunt shoes SS, one on each side of the vehicle, connected together by a cable 7 of very low resistance and reactance, preferably having a loop $7^1$ therein, for a purpose to be later explained, whereby to shunt across the contact rails CR and indicate occupancy of a block by shunting the track relay, as $T^1$ to cause the relay to release in the usual manner. The relay is connected up, as described above, through a rectifier whereby to make it very sensitive to a shunt even though the shunt have a relatively high reactance, or resistance, or both, due to the fact that in a circuit employing a rectifier, the impedance to current flow below a given critical voltage becomes very high so as to approximate practically an open circuit.

Inductively related to the cable 7, or preferably to the loop $7^1$, is a receiving winding 15, connected through a condenser 16 to tune the receiving circuit to resonance at the frequency of current from source $f^2$, this receiving circuit being connected to an amplifier Amp, which can be of any usual or desired character, such for example as shown in Patent No. 1,824,174 granted September 22, 1931. This amplifier has its output side connected to a filter Fil of any usual or desired character, and which can be arranged, by means of an inductance and capacitance, in any usual manner, to pass most freely frequencies of the order of current from source $f^2$, conveniently termed frequency $f^2$, and deliver such frequencies of alternating current to a main relay MR.

A contact finger 17, of relay MR, is arranged to control a circuit connected to cab signals, brake control apparatus, or the like, in any usual or desired manner, as for example, as shown in Patent No. 1,593,554 granted July 20, 1926.

With the apparatus as described above, and considering the block B which is occupied by the vehicle V, the frequency $f^1$, always applied, and the frequency $f^2$, which is also applied since the block C, next in advance, is assumed to be unoccupied are shunted away from the track relay $T^1$ by the shunt shoes SS of the vehicle, whereby to de-energize the track relay and place any wayside signals at stop to indicate that the block B is a danger block for a vehicle approaching from the rear.

The current of frequency $f^2$, which passes through the cable 7 interconnecting the shunt shoes, induces current in winding 15, which freely passes to amplifier Amp, since this circuit is tuned to resonance at frequency $f^2$. The amplified current of frequency $f^2$, passes through filter Fil, which additionally filters out any frequency other than $f^2$, to energize the master relay MR. With relay MR energized, contact finger 17 thereof is in picked-up position, to thereby place the cab signals, not shown, at proceed, (or to hold off the brakes, if such be the control) to indicate to the engineer that there is nothing ahead of him to prevent him from proceeding at speed.

In the event that block C, the first in advance of block B, should be occupied, the energy of frequency $f^2$ is cut off from block B at contact finger $14^2$ of track relay $T^2$. In such circumstances, no energy reaches relay MR which therefore releases its contact finger 17 to give a stop signal in the cab, (or possibly to apply the brakes) thus indicating that the block in advance is occupied.

It is, of course, obvious that instead of employing a single frequency $f^2$, two different frequencies could be used therefor, to thereby give three or four position control instead of, as described, a two-position control.

The auxiliary shunt shoes SS, of this invention, can of course be employed in connection with direct current track circuits, equally as well as with alternating current track circuits, in which case the track circuit energy of frequency $f^1$ would be replaced by a source of direct current, and the rectifier R connected in the track relay circuit would be dispensed with.

Thus, in the form of invention shown in Fig. 2, applicant has provided an auxiliary shunt means for indicating occupancy of a track block by a vehicle, even though the vehicle is not in electrical connection with the rails or tread on which it runs.

It should be understood that contact rails CR, in case the running rails are of conducting material, are constituted by the running rails themselves, as for example, in connection with a rubber tired vehicle running on steel rails. In Fig. 2B is shown a modified form of the invention wherein the running rails 101 are usual conducting rails on which run car wheels 102 carrying insulating tires, such as rubber tires 103. In the event the running rails are not of conducting material, then the contact rails will be either additional electrically conducting rails, suitably positioned along the wayside, or may be conducting wires or the like, and the shunt shoes SS can be constituted either, as shown, by conducting members in slidable contact with the contact rails, or can be of the roller or of the pantograph type, or any other usual or desired type.

In the form of Fig. 2A, the receiving winding 15 of Fig. 2 is positioned over the two rails $CRa$, as windings $15a$, ahead of the shunt shoes $SSa$, and arranged to have the voltages induced therein by currents in $CRa$, cumulative.

Figure 3:
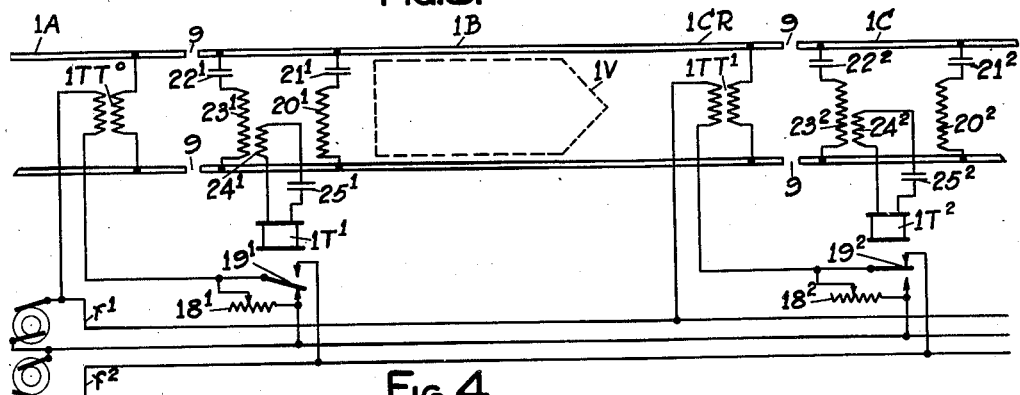
Fig. 3 is a diagrammatic view of trackway apparatus in accordance with a second form of the invention.
Figure 4:
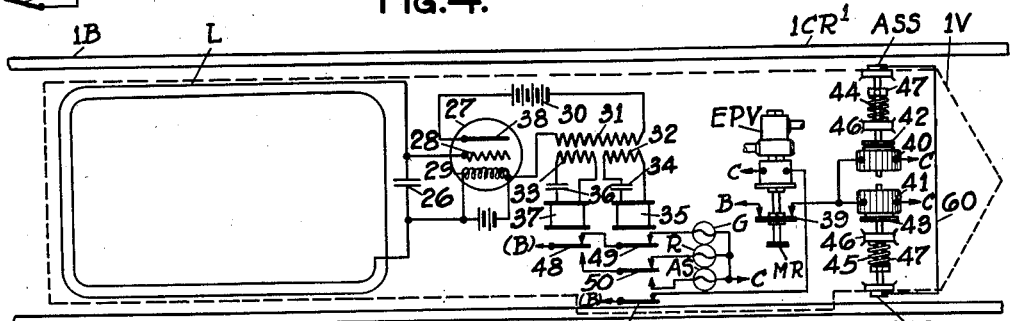
Fig. 4 is a diagrammatic view of car-carried apparatus in accordance with the second form of invention, as referred to in Fig. 3.

Referring now to Figs. 3 and 4, which show a modified form of the invention, in Fig. 3 are shown contact rails $ICR$, divided into blocks $IA$, $IB$ and $IC$ by means of insulated joints or gaps 9, with a vehicle $IV$ shown as occupying the block $IB$.

Along the wayside are transmission lines carrying alternating currents $f^1$ and $f^2$ of different frequencies $f^1$ and $f^2$, $f^1$ being the current used to indicate occupancy, while $f^2$ is employed for signal control.

Across the exit end of each block is a track transformer, as $ITT^1$, having its secondary connected across the contact rails. The primary of this transformer is connected across the source $f^1$ through an adjustable reactance $18^2$, and through a parallel path, including a contact finger $19^2$ and back point of a track relay $IT^2$, whereby the occupancy indicating source $f^1$ is always connected across the contact rails of each block.

The source $f^2$ is connected to the primary of the track transformer through a contact finger 19 and front point, of the track relay of the block next in advance, whereby this source $f^2$ is always connected across the end of each block, unless the block next in advance be occupied.

Across the entrance end of each block is a tuned conductor comprising an inductance 20 and a condenser 21 which tune the contact rail circuit including them to resonance at frequency $f^2$. Also connected across the entrance end of each section is a condenser 22, and the primary 23 of a transformer, the secondary 24 of which is connected, through a condenser 25 to a track relay, as $IT^1$, and these various condensers and inductances tune the track circuit including the track relay to resonance at frequency $f^1$.

With the trackway apparatus as described just above in connection with Fig. 3, with a vehicle, as $IV$ occupying the block $IB$, apparatus on the vehicle, to be described below, operates to shunt the track relay $IT^1$ to thereby cut signal control energy $f^2$, off of block $IA$, the block directly to the rear.

In the event that the block in advance is not occupied, as for example, should block $IC$ be unoccupied, this signal control energy $f^2$, as well as the energy $f^1$ are both applied through the track transformer $ITT^1$ to the exit end of the block, as $IB$.

Referring now to the car-carried apparatus employed in this form of invention, as shown in Fig. 4, the vehicle $IV$, indicated diagrammatically by dotted lines, carries a large loop L of wire or the like, of one or more turns, which loop may be wound about the outside of the car, or be carried in any other desired manner, so that two of its opposite sides will be positioned in sufficiently close inductive relationship to the contact rails $ICR^1$.

The loop L is connected in a closed circuit through a condenser 26, to tune this circuit to resonance at the occupancy frequency $f^1$, whereby the presence of a vehicle in a block and carrying such a tuned loop, by induction introduces additional impedance into the track circuit, therefore dropping relay $IT^1$ and removing energy of frequency $f^2$ from the block immediately to the rear.

A thermionic tube 27, having a usual plate 38, filament 29 and grid 28, has its grid circuit connected across the condenser 26 in the loop circuit. The plate circuit of the tube, includes a battery 30 and the primary 31 of a car transformer having two separate secondaries 32 and 33, the secondary 32 being connected through a tuning condenser 34 to a relay 35, and the secondary 33 being connected through a tuning condenser 36 to a relay 37, the condensers 34 and 36 respectively tuning the relay circuits to resonance at the frequencies $f^1$ and $f^2$. The primary 31 of the car transformer together with the plate 38, plate battery 30, and filament 29, constitute a circuit tuned to pass both frequencies $f^1$ and $f^2$.

Connected to be controlled by relay 35 is an electromagnetic device EPV, which when energized may maintain brakes, (not shown) in released position, but which may apply the brakes if de-energized, in a manner, for example, such as shown in Patent 1,824,174, referred to above.

The energizing circuit for EPV, as appears from the drawings, includes contact finger 61 and front point, whereby to repeat relay 35, whereby if the inductive effect of loop L, on the current of frequency $f^1$, the occupancy current, be either insufficient or wholly lacking, the device EPV is de-energized, even though the loop should be effective with regard to the signal control current, of frequency $f^2$.

The device EPV has a contact 39 which controls an energizing circuit to each of two holding coils 40 and 41. The holding coils 40 and 41 operate on armatures 42 and 43, to prevent springs or the like 44 and 45 from forcing auxiliary shunt shoes ASS outwardly and into physical contact with the contact rails $ICR^1$, the springs 44 and 45 operating between fixed abutments 46 and collars 47 pinned or otherwise fastened to the shafts carrying the auxiliary shunt shoes. The auxiliary shunt shoes are electrically interconnected by a low resistance and low inductance conductor 60, whereby to constitute a low resistance and low inductance shunt between the contact rails when the holding coils 40 and 41 are de-energized.

After having been applied, the shunt effect of ASS on the loop L might well prevent proper operation of L under all conditions, and accordingly, a restoring or reset means MR, is provided for resetting 39 to its attracted position, and can be manually operable.

The car-carried relays 35 and 37, which are controlled respectively by currents of frequencies $f^1$ and $f^2$, can, for example, control cab signals, by means of contact fingers 48, 49 and 50, a signal G, indicating proceed, being energized through contact finger 48 and front point, and contact finger 49 and front point; a signal R, indicating stop, being energized through contact finger 48 and back point, and contact finger 50 and front point; and a signal AS, indicating the presence of an auxiliary shunt shoe application, through contact finger 48 and back point, and contact finger 50 and back point.

With the apparatus of the form of invention as shown in Figs. 3 and 4, and as described just above, it will now be considered just what occurs on a vehicle, as $IV$, occupying the block $IB$, when the block immediately in advance is not occupied.

At the exit end of block $IB$, current of frequency $f^1$ and also current of frequency $f^2$ is applied to a transformer ITT¹. The loop L, (and the tube grid circuit) carried by the vehicle, and in inductive relationship to the contact rails, has induced in it currents of frequency $f^1$ and $f^2$, and these are amplified by the tube 27 and appear as pulsating currents in the car transformer primary 31 of the tube plate circuit. The secondaries 32 and 33 of the car transformer are respectively energized with currents of the frequencies for which they are tuned, namely $f^1$ and $f^2$, to energize relays 35 and 37, thereby completing the energizing circuit for the proceed signal G.

The device EPV is also energized through contact finger 61 and front point, to thereby complete energizing circuits for the holding windings 40 and 41 of the auxiliary shunt shoes, whereby to prevent the auxiliary shunt shoes from being applied, by their springs 44 and 45, to the contact rails ICR¹.

With the vehicle in the section IB, the current of frequency $f^1$ is so reduced, thereby, that track relay IT¹ releases its contact finger 19¹ whereby to cut energy of frequency $f^2$ off of the contact rails of the block IA, immediately to the rear, thus making this block IA a danger block.

A vehicle in a danger block, such as block IA, will have its loop L pick up only current of frequency $f^1$, and hence only current of frequency $f^1$ will appear in the primary 31 of the car transformer connected in the plate circuit of the car-carried apparatus. Accordingly, only the relay 35, energized by frequency $f^1$ will be energized, and relay 37 will release its contact finger 48, thereby displaying a cab signal R, indicating danger.

In case of a vehicle in a block, whether a clear or a danger block, should the loop L lose its inductive effect on the contact rails, for any reason whatsoever, as due to an open circuit, to too great a distance existing between the loop and the contact rails, or for any other reason, then there will appear no current, or insufficient current in the primary 31 of the car-carried transformer, of frequency $f^1$ (and of course of $f^2$), to sufficiently energize the transformer secondary 32 to maintain relay 35 up to thus allow EPV to be energized. Upon EPV becoming de-energized, its contact 39 opens to de-energize the holding windings 40 and 41, whereby to allow springs 44 and 45 to at once apply the auxiliary shunt shoes ASS to the contact rails.

Thus, upon failure, or insufficiency, of the inductive effect furnished by the loop L, a positive, and conducting shunt ASS, is automatically applied, and a signal, AS, in the cab, indicating that the auxiliary shunt shoes are in operation, is displayed through a circuit including contact finger 48 and back point, and contact finger 50 and back point.

Thus, in this particular form of invention, there is provided an inductive shunt, together with cab signals controlled thereby, in combination with an auxiliary shunt of the contacting type, which is automatically applied in case of any defect in operation of the inductive shunt.

The effect of the loop L, on the current in the contact rails, in reducing the amount of current therein, is more effective than is the usual track shunt of the contacting type, such as afforded by car wheels and axles, for example. The usual contacting shunt is most effective as a car occupies a block and becomes less effective as the car progresses through the block. But the effect of the inductive loop L is that of placing an impedance in the detector circuit, which travels with the car, and is equally effective regardless of the position of the car in the block.

Figure 5:
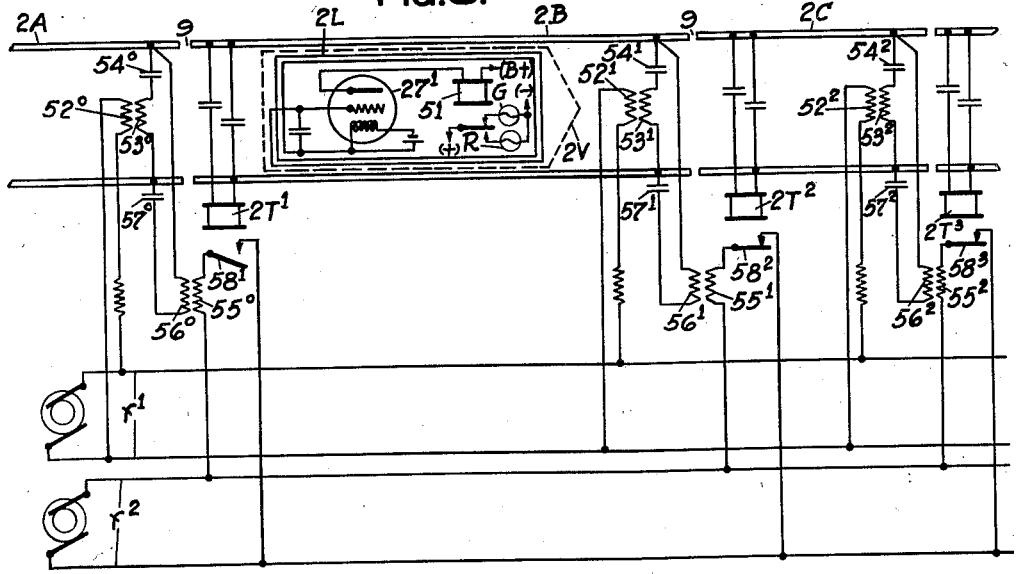
Fig. 5 is a diagrammatic view of trackway and car-carried apparatus in accordance with a third form of the invention.

Referring now to Fig. 5, there is here shown a slightly modified form of invention, deviating somewhat from the form shown in Figs. 3 and 4.

The car-carried apparatus of Fig. 5 has been shown in a somewhat simpler form than that of Fig. 4, but could be of the same type, and be exactly the same in form and operation if desired.

In Fig. 5 the loop 2L operates to shunt a track relay as 2T¹ and also, through a vacuum tube 27¹, to energize a relay 51 to cause proceed conditions to be given by a cab signal G, and to de-energize relay 51, under stop conditions, to give a stop signal R as is obvious from the drawings in view of the preceding description of Fig. 4.

With regard to the trackway apparatus of the form of invention shown in Fig. 5, two different sources and frequencies of alternating current $f^1$ and $f^2$, are employed, in the same manner as described above, but these frequencies are applied, in each case to the exit end of each track block, in multiple, instead of in series as in Fig. 3.

The frequency $f^1$ is applied, for example, to the block 2A through the primary 52 of a transformer, the secondary 53 of which is connected across the track rails through a condenser 54 which tunes the application circuit to resonance at the frequency $f^1$.

The frequency $f^2$ is applied to the exit end of block 2A, for example, through the primary 55 of a transformer, the secondary 56 of which is connected to the contact rails through a condenser 57 which tunes the application circuit to resonance at the frequency $f^2$. Here again, as in connection with Fig. 3, the frequency $f^2$ is controlled by a contact finger, as 58, and front point of a track relay 2T¹ of the block next in advance.

The tuning means referred to just above, (condensers 54 and 57), tune their respective circuits so as to prevent short circuiting the frequency $f^1$ through the supply circuit for frequency $f^2$, and vice versa.

The above description of several forms of applicant's invention has been given solely by way of example, and it is contemplated that additional cab indications and additional wayside indications can be supplied by any usual or well known means without departing from the scope of the present invention, and furthermore any usual or desired means for supplying contact rails or contact wires can be employed and still be wholly within the scope of this invention.

The above rather specific description of several forms of this invention, has been given solely by the way of example, and is not intended, in any manner whatsoever, in a limiting sense. It is also to be understood that various modifications, adaptations and alterations may be applied to meet the requirements of practice, without in any manner departing from the spirit or scope of the present invention, except as may be limited by the appended claims.

Having described my invention, I now claim:—

1. In combination with a vehicle which is out of electrical contact with its running rails, a track circuit, and a vehicle carried electrically conductive shunt inductively related to the track circuit for inductively shunting the track circuit to indicate occupancy.

2. In combination with a vehicle out of electrical contact with its roadway, a track circuit associated with the roadway, a source of alternating current track circuit energy connected to the track circuit, a source of alternating current train control energy of a frequency different from that of the track circuit energy connectable to the track circuit, shunting means on the vehicle for shunting the track circuit, and tuned control means on the vehicle, and including the shunting means for controlling the vehicle.

3. In combination with a vehicle which is out of electrical contact with its running rails, a track circuit, a main shunt carried by the vehicle for shunting the track circuit, an auxiliary shunt on the vehicle, and means for making the auxiliary shunt effective upon failure of the main shunt.

4. In combination with a vehicle, a track circuit, a main shunt on the vehicle for shunting the track circuit, an auxiliary shunt on the vehicle, and means for making the auxiliary shunt effective upon failure of the main shunt.

5. In combination with a vehicle which is out of electrical contact with its running rails, a track circuit, a main shunt carried by the vehicle and arranged for inductively shunting the track circuit, an auxiliary conducting shunt on the vehicle, and normally ineffective to shunt the track circuit, and means for making the auxiliary shunt effective upon failure of the main shunt.

6. In a control system, in combination with a pulsating current track circuit and a vehicle which is out of electrical contact with its running rails, a conducting loop on the vehicle in inductive relationship to the circuit and tuned to resonance at the frequency of the track circuit energy, whereby the current intensity in the track circuit is varied in accordance with the presence and absence of the vehicle and occupancy indicating means controlled by such variations in the track circuit to indicate occupancy of said track circuit.

7. In combination with a vehicle which is out of electrical contact with its running rails, a track circuit, a main shunt carried by the vehicle and arranged for inductively shunting the track circuit, an auxiliary conducting shunt on the vehicle, and normally ineffective to shunt the track circuit, and means for making the auxiliary shunt effective upon failure of the main shunt, the main shunt including a conducting loop with opposite sides adjacent the track circuit, the track circuit being energized with alternating current, and the shunt loop being tuned to resonance at the frequency of the track circuit energy to thus improve its inductive shunting effect.

8. In a control system, in combination with an alternating current track circuit and a vehicle which is out of electrical contact with its running rails, a conducting loop on the vehicle in inductive relationship to the circuit whereby the current intensity in the track circuit is varied in accordance with the presence and absence of the vehicle and occupancy indicating means controlled by such variations in the current in the track circuit to indicate occupancy of said track circuit.

9. In combination, a vehicle, a track circuit, two sources of alternating current energy of different frequencies normally included in the track circuit, an inductive loop on the vehicle positioned in inductive relation to the track circuit, an electrically conductive shunt on the vehicle and normally ineffective to shunt the track circuit, and means for making the conductive shunt effective, upon failure of the inductive shunt to effectively shunt the track circuit.

10. In a control system, in combination with an alternating current track circuit and a vehicle which is out of electrical contact with its running rails, a conducting loop on the vehicle in inductive relationship to the circuit whereby the current intensity in the track circuit is varied in accordance with the presence and absence of the vehicle, and a signal controlled by current in the track circuit to indicate "proceed" in the absence of a vehicle within said track circuit, and to not so indicate in the presence of a vehicle therein.

11. In combination, a vehicle, a track circuit, two sources of alternating current energy of different frequencies normally included in the track circuit, an inductive loop on the vehicle positioned in inductive relation to the track circuit, an electrically conductive shunt on the vehicle and normally ineffective to shunt the track circuit, and means for making the conductive shunt effective, upon failure of the inductive shunt to effectively shunt the track circuit, the two sources of alternating current being applied to the track circuit in series.

12. In combination, a vehicle, a track circuit, two sources of alternating current energy of different frequencies normally included in the track circuit, an inductive loop on the vehicle positioned in inductive relation to the track circuit, an electrically conductive shunt on the vehicle and normally ineffective to shunt the track circuit, and means for making the conductive shunt effective, upon failure of the inductive shunt to effectively shunt the track circuit, the two sources of alternating current being applied to the track circuit in multiple.

13. A detector circuit including; a source of pulsating current, conductors paralleling a vehicle pathway, a vehicle out of electrical contact with its pathway, and a translating device energized by current in said circuit, in combination with a vehicle carried circuit having electrical characteristics such that the current in the detector circuit is decreased by the association therewith of the vehicle carried circuit, whereby to de-energize the translating device.

14. In combination with a vehicle which is out of electrical contact with its running rails, a trackway circuit, and a vehicle carried electrically conductive shunt inductively related to the trackway circuit for inductively shunting the trackway circuit to indicate occupancy.

15. In combination with a vehicle which is out of electrical contact with its running rails, a trackway circuit, a main shunt carried by the vehicle for shunting the trackway circuit, an auxiliary shunt on the vehicle, and means for making the auxiliary shunt effective upon failure of the main shunt.

16. In combination, a vehicle, a trackway circuit, two sources of alternating current energy of different frequencies normally included in the trackway circuit, an inductive loop on the vehicle positioned in inductive relation to the trackway circuit, an electrically conductive shunt on the vehicle and normally ineffective to shunt the trackway circuit, and means for making the conductive shunt effective, upon failure of the inductive shunt to effectively shunt the trackway circuit, the two sources of alternating current being applied to the trackway circuit in series.

17. In combination with a vehicle which is out of electrical contact with its running rails, a trackway circuit, a main shunt carried by the vehicle and arranged for inductively shunting the trackway circuit, an auxiliary conducting shunt on the vehicle, and normally ineffective to shunt the trackway circuit, and means for making the auxiliary shunt effective upon failure of the main shunt, the main shunt including a conducting loop with opposite sides adjacent the trackway circuit.

18. In combination with a vehicle which is out of electrical contact with its running rails, a trackway circuit, a main shunt carried by the vehicle and arranged for inductively shunting the trackway circuit, an auxiliary conducting shunt on the vehicle, and normally ineffective to shunt the trackway circuit, means for making the auxiliary shunt effective upon failure of the main shunt, the main shunt including a conducting loop with opposite sides adjacent the trackway circuit, the trackway circuit being energized with alternating current, and the shunt loop being tuned to resonance at the frequency of the trackway circuit energy to thus improve its inductive shunting effect, and vehicle control means controlled by the shunting loop.

19. In combination, a vehicle, a trackway circuit, two sources of alternating current energy of different frequencies normally included in the trackway circuit, an inductive loop on the vehicle positioned in inductive relation to the trackway circuit, an electrically conductive shunt on the vehicle and normally ineffective to shunt the trackway circuit, means for making the conductive shunt effective, upon failure of the inductive shunt to effectively shunt the trackway circuit, means tuning the loop to the frequency of one of said sources, a control circuit connected to the loop and tuned to pass both of said frequencies, and a signal circuit connected to the control circuit and including frequency control means.

20. A system for detecting the presence of a railway vehicle at any point in an extended portion of track comprising, a wayside circuit including track inductors extending along the said portion of track, means for energizing said circuit at one end with alternating current, a condenser at the other end of said circuit tuned to resonance at the frequency of said alternating current, and electro-responsive means controlled by the current in said circuit and responsive to the presence of a vehicle on the track.

WADE H. REICHARD.